Aug. 9, 1927.

A. VANDERVELD 1,638,514

SHUTTER FOR COMPUTING MACHINES

Filed April 3, 1922   3 Sheets-Sheet 1

Inventor
Anthony Vanderveld.
By Frank E. Liverance, Jr.
Attorney.

Aug. 9, 1927.
A. VANDERVELD
1,638,514
SHUTTER FOR COMPUTING MACHINES
Filed April 3, 1922 3 Sheets-Sheet 2
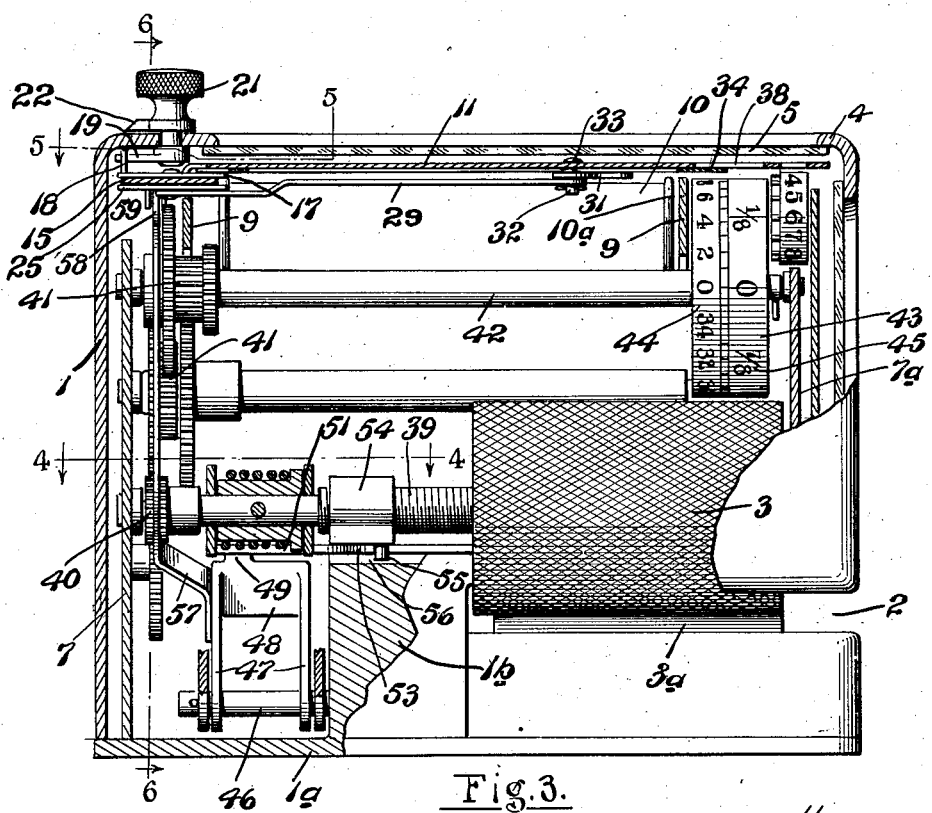
Fig.3.
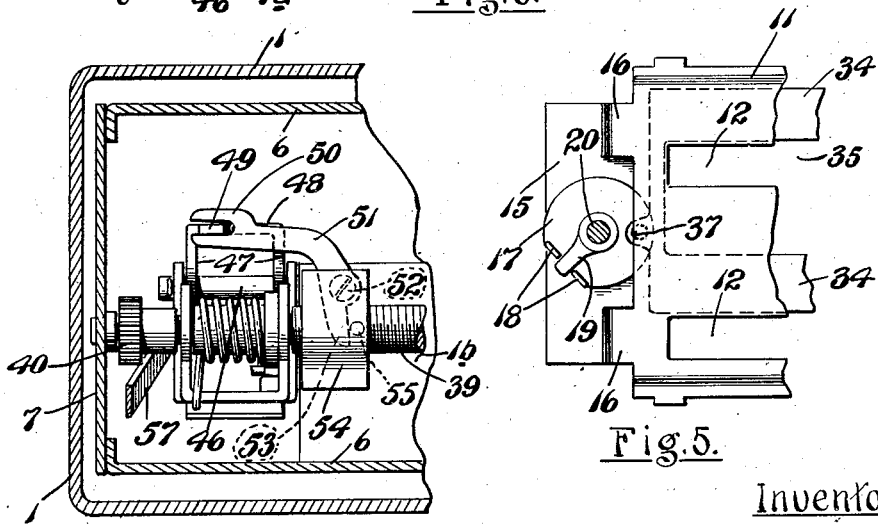
Fig.4.
Fig.5.
Inventor
Anthony Vanderveld.
By Frank E. Liverance Jr.
Attorney.

Aug. 9, 1927.

A. VANDERVELD 1,638,514

SHUTTER FOR COMPUTING MACHINES

Filed April 3, 1922   3 Sheets-Sheet 3

Inventor
Anthony Vanderveld.
By Frank E. Liverance Jr.
Attorney.

Patented Aug. 9, 1927.

1,638,514

UNITED STATES PATENT OFFICE.

ANTHONY VANDERVELD, OF GRAND RAPIDS, MICHIGAN.

SHUTTER FOR COMPUTING MACHINES.

Application filed April 3, 1922. Serial No. 549,150.

This invention relates to a shutter for use in combined measuring and computing machines, of the type shown in my Patent No. 1,420,612, issued June 20, 1922. In such machine, a computing chart is visible at portions thereof through two elongated openings in a member at the upper part of the machine, and a measurement indicator is also visible, showing the yards and additional fractions or inches of a yard that has been measured, the computations on the chart being with relation to fractions of a yard but not with respect to inches measurement. If a certain number of inches of goods over and above the required number of yards is desired, and such number of inches does not coincide with a fractional part of a yard as selected for the computations, it is apparent that the computing chart does not give an accurate computation, while some computations will be visible and may be mistaken by the clerk for the proper cost of the goods measured. For instance, if eleven inches of goods or if any definite number of yards plus eleven inches should be bought and measured, the nearest fractional computation would be for three eighths of a yard, or thirteen and one-half inches, and if the clerk should mistakenly take such computations for the goods sold, the customer would pay for two and one-half inches more of the goods than was received.

The measuring indicator shows both inches and fractions of the yard so that the goods may be accurately measured should the customer wish to buy either way. The present invention is directed to a shutter mechanism which may be manually operated to either open or closed position when the machine is at zero position, and at no other time, completely covering the openings through which the computing chart characters are visible when in closed position and also covering the inches indicating characters of the measurement indicator so that the fractional indications only are visible. When in open position, the shutter is moved so that the computations and inches of measurement are both visible. Mechanism is present in the machine such that after the shutter has been moved manually to either open or closed position when at zero position, the movement of the mechanism away from such zero position serves to automatically lock the shutter in either position to which it has been moved and such lock is effective at all positions of the measuring mechanism except the zero position, so that no changing of position of the shutter can be had after a measuring operation has been started. Accordingly, if a customer wishes to buy a certain number of inches or yards and inches of goods, the shutter is moved to closed position while the machine is at zero position and before the measuring operation is started, the goods measured and the computation therefor performed by the clerk without reference to the machine. On return of the machine to its zero position, the shutter may be left in closed position or opened if the next measuring operation is to be for fractions or yards and fractions of a yard, in which case the computation for the goods sold is taken from the chart.

My invention has for its object and purpose the attainment of the above described ends, together with others not specifically enumerated, but which will appear fully as understanding of the invention is had from the following description, taken in connection with the accompanying drawings, in which, Fig. 1 is a plan of the machine equipped with my invention, showing the shutter in dotted lines and in open position.

Fig. 3 is a longitudinal vertical section through the machine.

Fig. 4 is a fragmentary horizontal section and plan on the plane of line 4—4, of Fig. 3.

Fig. 5 is a similar plan and section on line 5—5 of Fig. 3.

Like reference characters refer to like parts in the several figures of the drawings and the sections taken are shown in the directions indicated by the arrows associated with the section lines.

Figure 1:
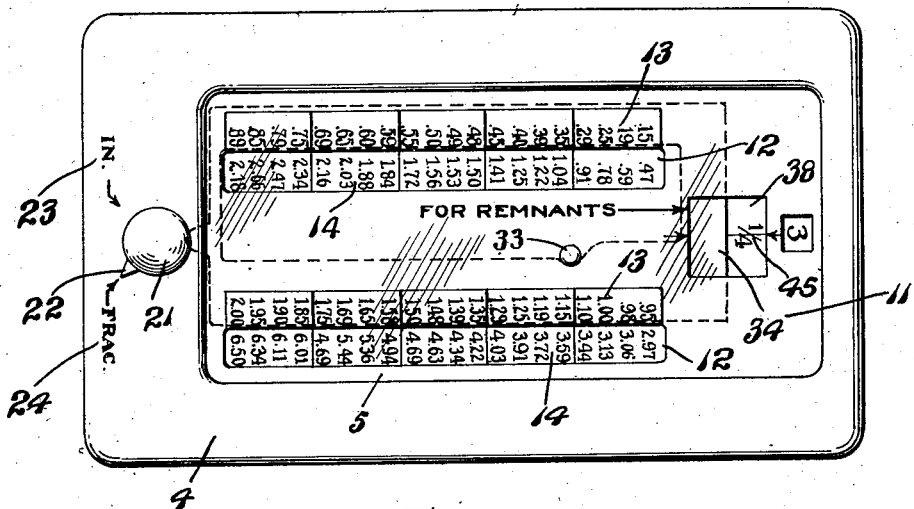

The machine mechanism is housed within a casing 1 and carried chiefly on a base 1ª. The casing 1 at its front lower portion has a horizontal slotted entrance 2 for the insertion of the edge of cloth or of ribbon between two rollers 3 and 3ª, the latter of which is spring pressed against the goods between the rollers, in turn pressed against the upper roller 3 so as to drive the same by friction of the cloth drawn between the rollers. The casing has its top 4 cut away for a considerable portion, the opening made being filled with a glass 5.

Figures 6, 7, 8:
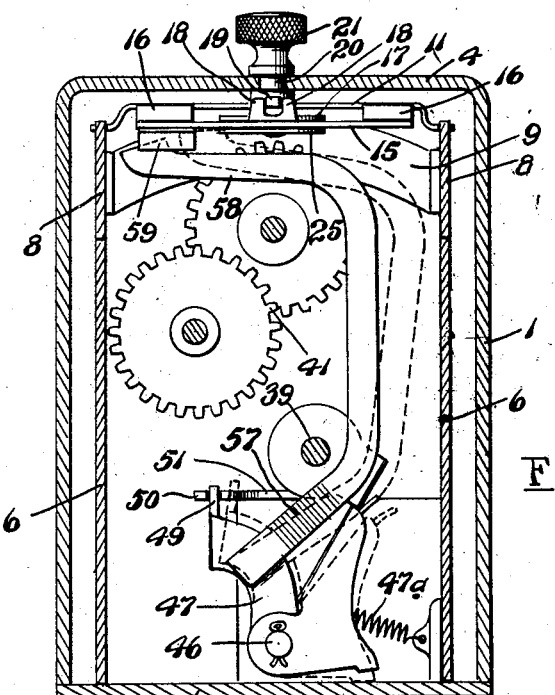
Fig. 6 is a transverse vertical section on the plane of line 6—6, of Fig. 3.
Fig. 7 is an under plan view of the shutter and plate on which it is mounted, showing the locking mechanism in inoperative position.
Fig. 8 is a fragmentary under plan, showing the locking mechanism in operative position.

The mechanism of the machine is mounted on and carried by a supporting frame within the casing, including two vertical side plates 6, a rear end plate 7 and a front end plate 7ª, said frame plates paralleling and being spaced a short distance from the sides and ends of the casing. A chart carrying frame comprised of side bars 8 and connecting cross bars 9 is mounted on and above the supporting frame the sides 8 resting on the upper edges of sides 6, as shown in Fig. 6. A chart 10 is mounted on suitable rollers 10ª (see Fig. 3) mounted in the frame, directly under a sheet metal plate 11 which is mounted and rests on the sides 8 of the chart carrying frame. Plate 11 has two elongated openings 12 therethrough and on its upper side at each opening a strip 13 carrying a series of prices per yard is fixed The chart is also printed with a series of cost figures, indicated at 14, having a definite relation to the price per yard figures on the strip 13. These figures are printed on the chart in a series of columns, one for each yard and fractional part thereover that can be measured and indicated by the machine, and it is designed that the columns of figures corresponding to the amount measured and indicated shall come into view as such amounts are indicated. The mechanism for accomplishing this forms no part of the present invention and is not specifically shown and described.

At its rear end, plate 11 has a portion 15 pressed downwardly to lie in a somewhat lower horizontal plane, being connected to the main plate 11 by integral connections 16 (see Fig. 5). A disk 17 of sheet metal, formed with two spaced apart upwardly turned ears 18 at one side, is rotatably mounted on and above the part 15. An arm 19 projecting radially from the lower end of a rod 20 passes between the ears 18 (Figs. 5 and 6), and said rod 20 passes through the top 4 of the casing and is equipped with a knurled head 21 for manual operation, the head, rod and arm being turned back and forth about the axis of said rod 20. A pointer 22 (Fig. 1) extends from the head and is adapted to be swung from the inches indication at 23 on the upper side of the casing to the fractions indication at 24, or vice versa, as will be evident.

On the under side of the portion 15 directly under disk 17 is a second disk 25 of sheet metal (Figs. 6 and 7), the two disks being permanently connected together by a pin 26 located at their centers and passing through the part 15, the disks having a free rotative movement about the vertical axis of the pin. Disk 25 at two spaced apart points in its periphery has notches 27 and 28 cut therein, the purpose of which will later appear.

A link 29 is pivotally connected at 30 at one end to the disk 25 at a point between the two sets of notches 27 and 28, extending under the plate 11 for a distance and having a pivotal connection at its other end to a bell crank lever 31, at the end of one arm thereof as shown at 32. The bell-crank lever is pivotally mounted between its ends on a stud 33 which passes downwardly through the plate 11.

A shutter plate 34 of sheet metal, formed with a large elongated opening 35 therein is located directly under the plate 11 and over link 29, having a pivotal connection at 36 to the opposite end of the lever 31 and at its front end having a pivotal connection at 37 to the upper disk 17. It is evident that on turning the head 21, shutter plate 34 is moved both lengthwise and laterally from one position, such as shown in Fig. 7 to another position, shown in Fig. 8, or vice versa. In the position shown in Fig. 8, the portions of the shutter plate at each side of the opening 35 therethrough come directly under the openings 12 in plate 11 and shut off any sight of the chart 10 underneath. When moved to its extreme position in the opposite direction, or farther than shown in Fig. 7, and to the position shown in Figs. 1 and 5, the openings or slots 12 are uncovered and free sight of the chart indications may be had.

In this connection, a measuring indicator is visible through another opening 38 in the plate 11, being more or less covered by the plate 34 in its opened position, but entirely uncovered in its closed position. This indicator is operated automatically with the passage of cloth between the rollers 3 and 3ª, as follows.

Figure 2:
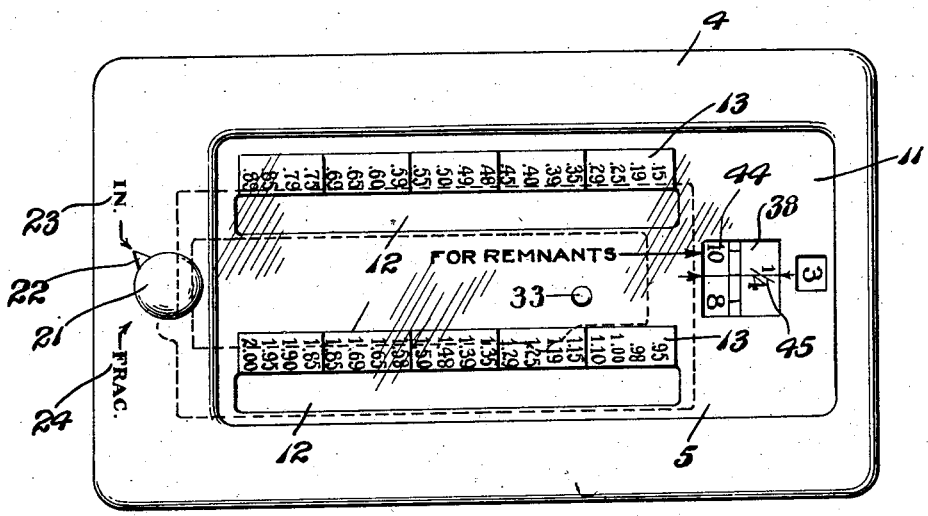
Fig. 2 is a like view with the shutter closed.

The roller 3 which may be termed the measuring roller is fixed on a shaft 39 horizontally mounted on and between the plates 7 and 7ª, a pinion 40 near the rear end of the shaft driving a train of gearing, indicated at 41 to drive a shaft 42 mounted above and parallel to shaft 39. A measuring indicator drum 43 is secured on shaft 42 near its front end and directly under the opening 38 heretofore described. On the rear portion of the drum, a consecutive series of figures are carried to indicate the inches in a yard, as shown at 44 (Fig. 3), and around the front portion a second series of indicating characters for fractions of a yard are carried as shown at 45. The size of the roller 3 and the relation of the gearing is such that for every yard of goods passed lengthwise between the rollers, shaft 42 and the attached drum, make a single complete revolution, and the amounts in inches or in fraction of a yard passed are disclosed as the measurement progresses on noting the drum. Normally, when the machine is used for computing as well as measuring, with the shutter open, as in Fig. 1, said shutter partly covers the drum and the inches characters do not appear. In the other position, in Fig. 2, with the shutter closed, the opening 38 is entirely uncovered and the inches, as well as the fractions appear for view.

In order to keep the shutter locked in either position to which it is manually turned, when the mechanism is at zero position, the following construction is used: A block 1$^b$ (Fig. 3) is cast integral with the base 1 and extends upwardly therefrom. From this block a rod 46 extends to the rear on which a U-shaped member of metal is loosely mounted comprising two spaced apart legs 47, connected by a cross member 48. A tongue 49 extends from the cross bar into a slot in the forked end 50 (Fig. 4) of a lever 51 which is pivotally mounted between its ends at 52 on the upper side of the block 1$^b$; a finger 53 on the end of the lever extending horizontally across the block. A nut 54 is mounted on a threaded portion of the shaft 39 and moves back and forth thereon with the rotation of the measuring roller in opposite directions. A pin 55 projects downwardly from the lower side of the nut and is guided in a slot 56 in the upper side of block 1$^b$. When the machine is in zero position, the nut 54 is farthest away from the roller 3 and pin 55 engages the finger 53, turning the lever to thereby move the U-shaped member away from its normal position shown in dotted lines in Fig. 6 to the full line position shown in said figure. Spring 47$^a$ has a tendency to keep the U-shaped member in the dotted line position.

An irregularly shaped locking bar 57 is permanently secured at its lower end to one of the legs 47 of the U-shaped member, extending upwardly therefrom for a distance nearly to the plates 11 and 34 and then turned substantially at right angles to make an arm 58, the end of which is received between two guide lips 59 (Figs. 6 and 7) depending from the part 15 to one side of the disk 25 mounted on and under the same. This arm 58 in the normal position of the parts, shown in dotted lines in Fig. 6, is engaged in one of the notches of the two series of notches 27 and 28, and will so engage whenever the machine is away from zero position. In the zero position, the arm 58 is moved away from the disk 25 and has no engagement therewith, at which time the operator is free to change the position of the shutter. With the shutter in a selected position, as soon as the measuring operation is begun, with a consequent movement of nut 54 and pin 55 toward roller 3, the locking of the shutter against movement is accomplished through the release of the U-shaped member and the engagement of the locking bar 57 with the disk 25 (Fig. 8). The shutter is held against further operation or change of position until the mechanism is again returned to zero position. I have shown two notches 27 and 28, though one only is needed if the shutter is thrown to its extreme positions, the additional notch being put in in case such extreme position is not made through carelessness of the operator; and more of the notches may be used, if it seems advisable, there being a necessity of insuring that the shutter is locked against movement even though carelessly operated.

In the operation of the machine cloth is placed between the measuring roller 3 and the pressure roller 3$^a$ and with the drawing of the cloth between the rollers the measuring roller 3 is operated to turn shaft 39 and through the gearing associated therewith and which is driven by the pinion 40, shaft 42 is rotated thereby turning the indicator drum 43 and driving one of the rollers 10$^n$ so as to wind the chart thereon. This brings the columns of computations 14 successively to the openings 12 in the plate 11 so as to indicate the cost of the goods which have passed between measuring and pressure rollers into view. At the end of a measuring operation and after the cost data has been taken from the chart and the measured length of goods taken from the indicators, a separation of the measuring and pressure rollers permits the entire mechanism to return to initial starting position under the force of a spring (not shown) which is tensioned during the measuring operation of the machine; the nut 54 returning to its initial starting position, shown in Fig. 3.

This construction is very simple, practical and has proved its efficiency for the attainment of the ends desired in an exceptionally satisfactory manner. In those States requiring the use of the same, it is an insurance against any overcharging of the customer for goods, or loss to the store proprietor from under charging. There can be no measurement in inches when the shutter is open to disclose computations, nor any taking of computations from the machine when a measurement in inches is made. Simplicity of construction, coupled with the automatic locking of the shutter in any position to which moved as soon as the machine begins to function, combine to make the device one of merit. The invention is defined in the appended claims and I consider myself entitled to all forms of structure coming within the scope thereof.

I claim:

1. In a measuring and computing machine, means for measuring a length of fabric material, means for indicating the cost thereof, a plate having openings through which said cost indications are visible, a shutter for covering said openings, means for manually operating the shutter, and means automatically locking the shutter operating means against movement when the machine is moved away from zero position.

2. In a measuring and computing machine, means for measuring a length of fabric material, cost indicating means for said measured length of material, a plate having openings therethrough for seeing the cost indicating means, a shutter mounted on the plate for movement to cover said openings or uncover the same, means for manually moving said shutter to either position, and means operable by the measuring mechanism to control the manual operation of the shutter whereby the shutter may be moved when the machine is at initial starting zero position and held from movement when the machine is at any other position.

3. In a machine of the character described, a sheet metal plate having parallel elongated openings lengthwise thereof and an additional opening located between and near one end of the longitudinal openings, a shutter located against the plate, a manually operable member rotatably mounted on the plate, and connections between said member and the shutter whereby on rotative movement of said member in one direction the elongated openings are uncovered and the additional opening partly covered, and in the opposite direction the elongated openings are covered and the additional opening entirely uncovered.

4. In a machine of the character described, a sheet metal plate having two parallel elongated openings therein, a shutter of sheet metal of rectangular outline having an elongated rectangular opening therein, two disks located one at each side of the plate and at one end thereof, a pivot member connecting the disks and rotatably mounting the same on the plate, a pivotal connection between an end of the shutter and one of the disks, a link bar pivotally connected at one end to the other disk, a lever pivotally mounted between its ends on the plate, and pivotal connections between one end of the lever and the shutter between the other end of the lever and the opposite end of the link bar and means for manually turning the disks, substantially as and for the purposes described.

5. In a measuring machine including cost indicia, a plate having openings for showing the cost indicia, a shutter operable to open or close said openings, means for manually moving the shutter to either position, and means controlled by the mechanism of the machine for rendering said shutter moving means inoperative except at the starting zero position of the machine.

6. In a mechanism of the character described, a plate having openings for showing cost indicia, a shutter movable to either open or close said openings, means for manually moving said shutter to either position, a locking bar, spring means normally holding the locking bar in engagement with the manually operable means to prevent operation thereof, and means associated with said locking bar for moving the locking bar against the force of said spring means to an inoperative position when the mechanism is at starting zero position.

7. In a mechanism of the character described, a measuring machine including a measuring roller adapted to be driven by frictional contact with cloth therewith, a shaft driven by the measuring roller, said shaft making one revolution for each unit length of material passing the measuring roller, an inches and fractions drum fixed on the shaft, a plate located over the drum and having an opening therein directly over the drum, a shutter movably mounted on the plate and movable to partially cover the opening and the inches indications on the drum when in one position and to wholly uncover the opening and drum in another position, means for manually moving the shutter to either position, means mounted to engage with the manually operable means and operable for rendering said manually operable means inoperative, and means engaging with said last mentioned means when the machine is at initial zero position to move said last mentioned means to inoperative position to free the same for manually moving the shutter.

8. In a machine of the class described, a measuring roller adapted to be operated by frictional contact of fabric drawn thereover, a shaft operated by said drum, said shaft making one revolution for each unit length of material passed by the roller, a drum fixed on the shaft having inches and fractions indicia thereon at different positions on the drum, cost indicia located back of the drum, a plate located over the drum and said cost indicia and having openings therein to disclose the cost indicia and the inches and fractions indicia on the drum, a shutter movably mounted on the plate, manually operable means for moving the shutter to cover the cost indicia opening and entirely uncover the drum opening in the plate, or in another position to entirely uncover the cost indicia opening and partially cover the drum opening to thereby cover the inches indicia on the drum, and means for locking said manually operable means against movement when the machine is at other than zero position.

9. In a machine of the class described, a measuring roller, a cost indicating chart driven thereby, a plate over the chart having openings to disclose the cost indications on the chart, a shutter movably mounted on the plate, means for manually moving the shutter to open or closed position, a locking bar, spring means normally tending to move the locking bar into engagement with said manually moving means to lock the same against operation, and means for overcoming said spring means whereby the locking bar may be moved to inoperative position when the machine is at or returns to zero position.

10. In a machine of the class described, a measuring roller, a threaded shaft on which said roller is secured, a nut mounted on the shaft, a pivotally mounted member, a locking bar connected thereto, spring means normally tending to draw said member and locking bar in one direction, means actuated by said nut and engaged with said member for moving the said member and attached locking bar in the opposite direction against the spring when the machine is at zero position, a cost indicating chart, a plate with openings therein over the chart, a shutter movably mounted on the plate, means for manually moving the shutter to either open or close said openings, said manually moving means being normally engaged and held by the locking bar against operation said nut automatically acting on the locking bar when the machine is at zero position for moving it out of engagement with said moving means.

11. In a machine of the class described, measuring mechanism including a measuring roller and a cost computing chart actuated thereby, a base on which said mechanism is mounted, a casing covering the mechanism having an opening at its upper side, a plate with openings therethrough mounted above the chart, a shutter movably mounted on the plate to cover or uncover the openings in the plate, means to which the shutter is attached mounted on the plate for movement to actuate the shutter, a manually operable member mounted on the casing and engaged with said means, a locking bar adapted to engage with said means and hold it against movement in either position to which it is moved, and means automatically operated by the measuring mechanism on its return to zero position to move said locking bar away from said means thereby freeing it for operation to actuate the shutter.

In testimony whereof I affix my signature.

ANTHONY VANDERVELD.